United States Patent [19]

Russell

[11] Patent Number: 6,097,104

[45] Date of Patent: Aug. 1, 2000

[54] HYBRID ENERGY RECOVERY SYSTEM

[76] Inventor: Thomas H. Russell, 14 Sulgrave Rd., West Hartford, Conn. 06107

[21] Appl. No.: 09/232,986

[22] Filed: Jan. 19, 1999

Related U.S. Application Data

[60] Provisional application No. 60/072,741, Jan. 27, 1998.

[51] Int. Cl.[7] ..................................................... F03D 9/00
[52] U.S. Cl. .............................. 290/54; 290/55; 290/1 R
[58] Field of Search .................................. 290/1 R, 1 A, 290/54, 55; 415/2

[56] References Cited

U.S. PATENT DOCUMENTS

| | | |
|---|---|---|
| 906,754 | 12/1908 | Tschirgi . |
| 3,956,902 | 5/1976 | Fields, Jr. ........................................ 62/3 |
| 4,200,783 | 4/1980 | Ehret ........................................ 219/365 |
| 4,319,141 | 3/1982 | Schmugge ................................ 290/52 |
| 4,379,972 | 4/1983 | Sosa et al. ................................ 290/44 |
| 4,398,096 | 8/1983 | Faurholtz ................................ 290/55 |
| 5,332,354 | 7/1994 | Lamont .................................. 415/4.2 |
| 5,394,016 | 2/1995 | Hickey .................................... 290/55 |

OTHER PUBLICATIONS

P. Gipe, *Wind Power for Home and Business*, Chelsea Green Publishing Company (1993) pp. 101–169.

J. Park, *The Wind Power Book*, Cheshire Books (1981) pp. 71–76 and 91–98.

L. Kamm, *Understanding Electro–Mechanical Engineering*, The institute of Electrical and Electronics Engineers, Inc. (1996) pp. 67–81.

T. Russell, *Direct Gain Industrial Building Without Redundancy Has Quck Pay Back*, International Solar Energy Society, Inc.

L. Valigra, *Carbon–Fiber Material May Open The Door To Smart Structures*, Christian Science Monitor (Mar. 26, 1998).

L. Dye, *Advanced Chip Revs Up Electric Car Technology*, Los Angeles Times Syndicate (Oct. 12, 1998).

*Primary Examiner*—Nicholas Ponomarenko
*Attorney, Agent, or Firm*—McCormick, Paulding & Huber LLP

[57] ABSTRACT

A system for recovering energy from the natural and man made sources of wind, water and sunshine provides within a given local area wind, water and solar apparatuses for converting all three wind, water and solar energies to electrical power to provide a reasonably steady supply of electrical power at all times. The wind and water apparatuses may be double speed Savonius rotor electrical generating apparatuses each of which includes two Savonius type rotors mounted adjacent to one another for rotation about a common axis with the blades of the rotor units being arranged so that the rotor units rotate in opposite directions relative to one another under the influence of a given wind or flow of water. The electrical generator of each apparatus includes a field means attached to one of the two rotors and an armature attached to the other of the two rotors so that the field means and armature rotate relative to one another at a speed approximately double the speed of rotation of each of the rotor units about the common rotational axis.

11 Claims, 5 Drawing Sheets

HYBRID ENERGY RECOVERY SYSTEM

CROSS REFERENCE TO RELATED APPLICATION

This application relates to Provisional U.S. Patent Application Ser. No. 60/072,741 filed on Jan. 27, 1998, the filing date of which is claimed here.

FIELD OF THE INVENTION

This invention concerns a hybrid system for recovering energy from naturally occurring energy sources such as the sun, the wind and flowing water, and from presently wasted manmade sources of light, wind and flowing water, by converting the energy contained in these sources into electrical and mechanical energy to be used either locally close to the places of recovery or to be included into a far-reaching electrical power transmission network, and it also deals more specifically with the construction of apparatuses and combinations of apparatuses used in the making up of such hybrid energy recovery system.

BACKGROUND OF THE INVENTION

A hybrid energy recovery system is one wherein energy is recovered from a number of different energy sources located within a relatively small area such as, for example, the area surrounding and including the space occupied by a given architecture such as a house, apartment, factory, office building or a set of such buildings. Such a hybrid energy recovery system is known, for example, from: Russell *Direct Gain Industrial Building Without Redundancy Has Quick Pay Back,* proceedings of the Fifth National Passive Solar Conference, University of Delaware.

There is increasing agreement around the world that people would benefit from a change from nuclear fuels, coal, oil and gas as energy sources to clean indefinitely renewable and locally available natural energy sources such as sunshine, wind, and flowing water to generate useful electrical power. The use of each one of sunshine, wind and flowing water as an energy source by itself has its strengths and weaknesses, such as time of day or night, season, weather conditions, location of generators near to points of use, special land and directional and topographic requirements, the amount and cost of required real estate, aesthetic considerations, safety considerations, noise considerations, etc. However, when these natural and manmade sources of energy are used in combination to generate electrical power, they can go a long way in solving another major and heretofore expensive problem, namely that of providing a reasonably steady and continuous source of electricity for storage in batteries and other energy storage devices and/or for use in powering lamps, motors and other devices.

It is also important to local communities that the equipment required to convert natural energy sources to electricity be easy to manufacture and assemble, be easy to install, and be easy to service and replace when necessary by fully qualified local labor. This keeps the money to be spent in the community, and helps solve a current major worldwide problem occurring in many communities and nations of having to spend vast amounts of monies out of town or out of the nation to pay increasing prices for increasingly scarce and unhealthy non-renewable energy material such as nuclear fuel, oil, gas and coal.

Natural energy assets such as sun, wind, and flowing water can be considered as being of two types: (a) inherently natural, and (b) byproducts of human activities. For instance, we brightly light buildings to attract attention, parking lots to be safe, signs to be seen. This light is a byproduct of human activity and it is possible to recapture some of it with photovoltaic devices without interfering with the purpose for which the light was initially intended. As another example, it is possible for photovoltaic material to be carried on south facing highway noise barriers to pick up enough light from the headlights of passing trucks, buses and cars to supplement natural sunlight picked up by the photovoltaics during daytime. In the case of wind energy, thousands of trucks, buses, and cars driving down highways at high speed cause major gusts of wind which are often enhanced and channeled by land formations and noise barriers. A series of properly designed wind powered electrical generators can generate electricity from these gusts. In the case of flowing water power, large amounts of water run from hills or buildings when it rains, and this flowing water can be channeled and directed to small water wheel electrical generators at lower levels or into ponds that hold the water and release it when supplemental electrical power is needed.

High buildings in heavily built up areas can be cost free mounts for south facing photovoltaics to capture solar energy from the sun or can be used to channel wind or rain water to small wind powered or water powered electrical generators, and smaller flows of water can be combined and directed into larger flows to power turbines driving more powerful electrical generators.

From what has been said above, one can visualize a number of high buildings connected by glass enclosed walkways across streets, possibly at several levels. Some walls that face roughly south may have photovoltaic generating devices mounted on them. When wind is deflected from buildings causing areas of high wind velocity, this high wind velocity can be used by putting a series of small rotor type wind electrical generators between the two walkways which will deflect and increase the wind speed and electrical generation. Service could be made easy by access to the rotors through the ceiling of the lower walkway or the floor of the upper walkway.

In considering a system for combining the recovery of solar, wind, and water energy, it will be noted that solar energy recovery devices are leading the way with rapid technological breakthroughs. The efficiency of the devices are increasing and the prices of them are falling. Reasonably efficient and reasonably inexpensive water-powered generators are also available. The conversion of wind power into electrical energy is, however, the crucial element in a natural energy recovery system.

Wind energy has the potential to be the major energy provider of a recovery system, but suffers from clinging to natural wind resources only. The emphasis has been on natural wind and the few and costly sites that naturally have the necessary wind speeds. New developments have focused on complicated windmills of the propeller and Darrieus rotor technologies that supply high efficiency, but also have high initial expense, require high towers in most locations, are subject to expensive and dangerous servicing atop high towers, require a lot of space, cannot effectively utilize intermittent gusts (which is very wasteful), and can be destroyed by wind shears. These complicated windmills also require time to swing to face the quick changes in wind direction in the case of propeller-type units, and have uncertain stalling and starting problems in the case of Darrieus designs. Both propeller devices and Darrieus devices have niche applications where they do well, but these are limited.

Transporting electricity long distances is increasingly expensive and dangerous, and the source of most service interruptions and accidents. The new rules separating distribution from generation further camouflages costs that are already misleading because emergency costs often are paid by local police, fire departments, disaster organizations, and the Federal government. With remaining large monopolies, utility control boards are less effective, and individuals have little influence short of forming cooperative or generating their own power on site. Even small wind generating and photovoltaics can operate thermostats, pumps, and blowers to maintain critical heat and communications during protracted outages.

The Savonius rotor as a wind energy recovery device has long been used for such high torque applications as pumping water and grinding grain. It is a simple device which can, if well designed, use rotor units formed in one piece to very accurate standards and using new materials, with possibly self-lubricating properties that are recyclable and inexpensive. The rotor unit is then mounted on a vertical pipe or other support passing vertically through the center of the unit so that the unit revolves around the pipe when the wind blows onto the unit from any direction with sufficient velocity. That is, the Savonius rotor can use wind from any and all directions at all times. This simple two-bladed Savonius rotor, or similar rotors with three or more blades, operates at relatively low speeds in comparison to some other types of wind-powered rotors and has usually been considered to be inefficient for electric generating purposes, with efficient generation of electricity usually being considered to require higher rotor speeds than generally available from Savonius rotors.

The object of the present invention is, therefore, to provide a hybrid energy recovery system for recovering energy in electrical and/or mechanical form from a combination of solar, wind, and flowing water energy sources, both naturally occurring and man made.

A further more detailed object of the invention is to provide a Savonius-type rotor apparatus which can be used for generating electrical power from wind power and which generates efficiently at higher speeds of electrical power production than do conventional Savonius rotors, with such higher speeds of electrical power production being obtained without gears or other mechanical speed-increasing devices.

Another object of the invention is to provide a Savonius-type rotor apparatus of the above-mentioned kind which can also be used in the energy recovery system of the invention to recover electrical energy from the energy of flowing water, and which can also be used for recovery of solar energy, the Savonius rotor having a relatively large surface area in comparison to propellers and many other types of wind driven devices and, therefore, being well suited to additionally serve as a solar energy recovery device.

SUMMARY OF THE INVENTION

The invention resides in a system for producing electrical energy from combined energy sources of sunshine, wind, and flowing water. More specifically, the invention resides in such a system wherein at least the apparatus for producing electrical power from wind is an apparatus made up of two Savonius rotor units, with the two rotor units being mounted end to end for rotation about a common central axis in opposite directions of rotation and with the adjacent ends of the two rotor units respectively carrying or being otherwise connected to field and armature parts of an electrical generating device, which field and armature parts cooperate during rotation of the rotor units to generate electrical power, the speed of rotation of said field and armature parts relative to one another being effectively double the speed of rotation of each one of the rotor units relative to the common axis, so that the electrical power is generated at a high speed or frequency more suited to the efficient generation of electrical power than is the lower speed of either rotor unit taken by itself.

The invention also resides in the energy recovery system of the invention including both a double speed Savonius rotor apparatus for generating electrical power from wind and another double speed Savonius apparatus for generating electrical power from flowing water.

The invention further resides in making the rotor of the wind driven electric power generator of materials, such as ones including carbon fibers, whereby the material of the rotors themselves can be used as electrical conductors, as electrical energy storage means, and/or as photovoltaic devices for converting solar energy to electrical energy; and/or in providing separate photovoltaic elements on surfaces of the rotors so that the rotors not only contribute to the recovery of energy from the wind or flowing water but also contribute to the recovery of energy from the sun. In the case where the carbon fibers are used for conducting electricity, they can be used as conductors for conducting the electricity produced by the photovoltaic devices associated with the rotors, as conductors for conducting electricity to or from parts of the electrical generator associated with the rotors, or as conductors for conducting electricity in a control circuit associated with the electrical generator.

The invention also resides in a double speed Savonius rotor apparatus of the above-mentioned kind wherein the apparatus includes a means for sensing the speed of each of the two rotors and an associated control system for controlling the generator portion of the apparatus to control the speeds of the rotors through the use of a regenerative or dynamic braking effect applied to the rotors by the generator, as for example, to keep the rotors from reaching possibly self-destructive speeds or from rotating at undesirable low speeds with the power absorbed by the generator in braking the speeds of the rotors being recovered as additional useful electrical power.

The invention also resides in a construction of the double speed Savonius rotor apparatus particularly well adapted for use with flowing water or in other situations where the apparatus is used in wet or damp environments.

*The Wind Book* by Jack Park published in 1981 by Cheshire Books in Palo Alto, Calif. has a photograph on page 75 of a three-tiered Savonius S rotor designed to generate electricity. In the background are transmission lines and towers suggesting this was a serious effort to develop wind electric generation by utilities. Traditional Savonius S rotors worked very differently from the wind electric Savonius rotors in this patent application. The S rotors and the vertical shift tower rotated together all in one direction and the bottom end of the shaft turned the water pump in the well or other devices.

Park says in his write-up "A rotor that slows air down on one side while speeding it up on the other, as does the S rotor, is subject to the magnus effect: lift is produced that causes the machine to move in a direction perpendicular to the wind. Spin on a baseball causes it to curve because of the magnus effect. An S rotor can easily experience lift forces equal to three times the drag load placed on the supporting tower. Many owner-built S rotors have toppled to the ground because their designers overlooked this phenomenon."

In addition to the vertical central shaft the picture shows a large heavy iron external frame with a very large foot print plus 4 guy wires and a large concrete base. Also, the rotors appear not to overlap the vertical shaft to deflect wind to the back side of the drag blade which increases performance substantially, according to Paul Gipe, author of *Wind Power, for Home and Business* published by Chelsea Green Publishing, White River Junction, Vt. in 1993. Gipe says on page 105 that 33% is the theoretical amount of energy Savonius S rotors can extract from the wind. While on page 105, he states the betz limit for lift devices is 59.3% but optimally designed rotors reach levels slightly above 40%. Usable energy is even less because energy is lost in transmissions, generators, and power conditioning (the equipment necessary to convert the energy into a form we can use). There are also loses due to rapid changes in wind speed and direction that are not accounted for in our simple formulas. On page 62, he sums this up and comes up with an overall efficiency of 29%. So there are hard numbers to back the case for new state-of-the-art Savonius counter rotating wind electric generators on site which can supplement natural wind with man-made architectural contributions to wind speed as well as man-made winds otherwise wasted.

Moving water can be a particularly valuable contributor to hybrid energy systems because (1) it can be stored high up where it is collected and held as potential energy to be released as needed, and (2) it can generate 24 hours a day regardless of weather and is usually most available in winter when photovoltaics are least productive and when energy demand is highest. Once installed small and micro turbines can generate at up to ten times lower cost than photovoltaics.

Moving water rotors work best when they rotate at roughly the same speed as the speed of the water that is their primary source. Low head moving water rotors turn slowly at speeds roughly similar to wind speeds. So basically the same counter rotors that generate electricity by double generating speed should work well for low head water.

High head water moving fast but with smaller volume neet micro pelton type rotors which turn so fast they need fans to cool them and even so equipped wear out their rotors quickly. Here again counter rotating rotors have the capacity to generate at the required High speed with each counter rotating rotor that the water hits having to rotate at only about half the speed of the generator.

Still other features of the invention will be apparent from the claims and from the following description and accompanying drawings describing preferred embodiments of the invention.

DETAILED DESCRIPTION OF THE PREFERRED EMBODIMENT

The energy recovery system of this invention may be associated with many different geophysical and architectural situations where sources of solar, wind, and flowing water energies are all available, although in differing degrees depending on time of day, weather conditions, and other factors, within a small area, to provide a reasonably continuous and useful amount of electrical power to be used by lamps, motors, and other electrical appliances, with or without accompanying storage batteries, in the local area or to be supplied to a more far-reaching electric power transmission network, with the system also possibly providing mechanical power for directly mechanically powering mechanical devices such as pumps and grinders.

Figure 1:
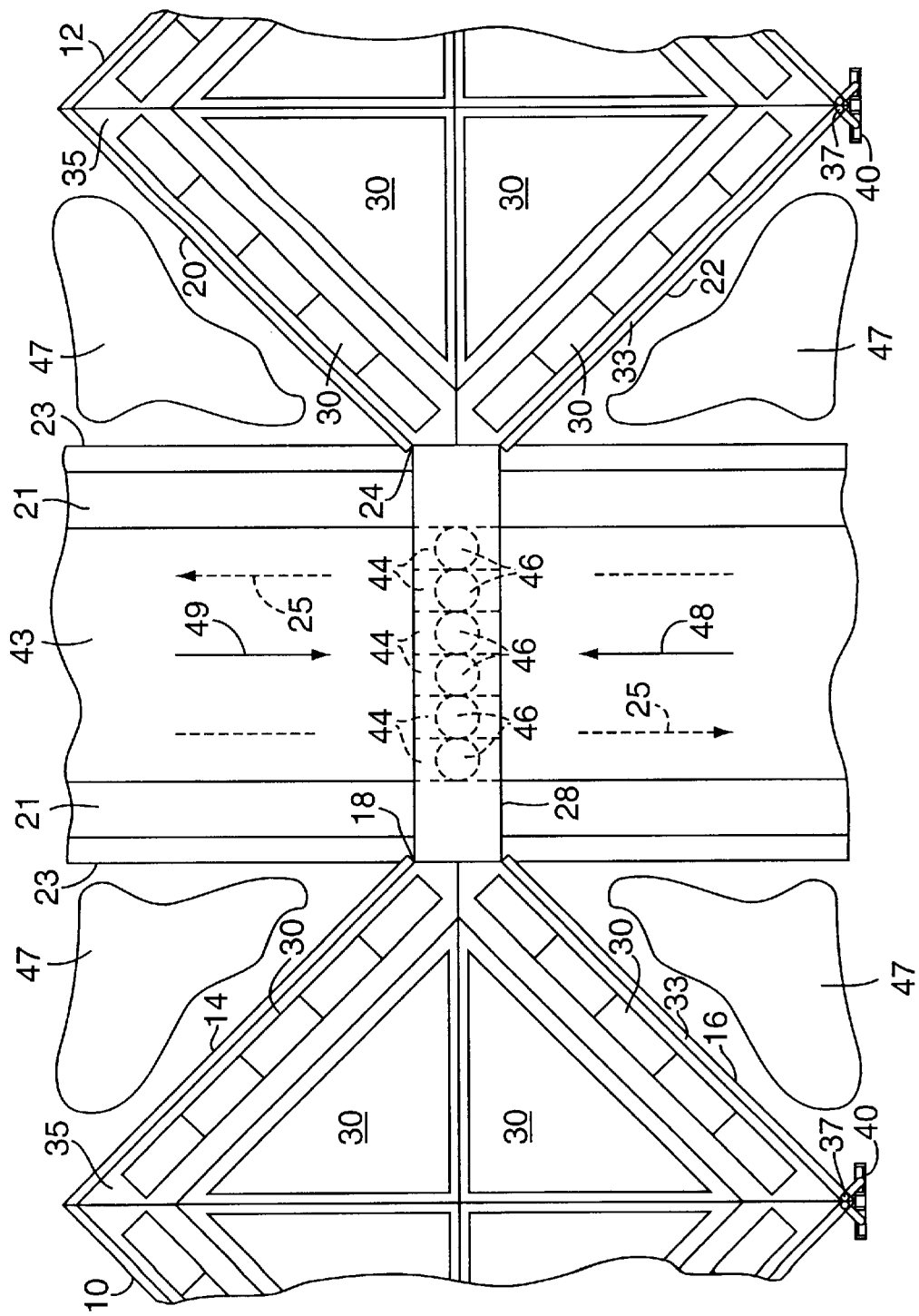
FIG. 1 is a plan view of an energy recovery system embodying this invention in association with an exemplary architecture.
Figure 2:
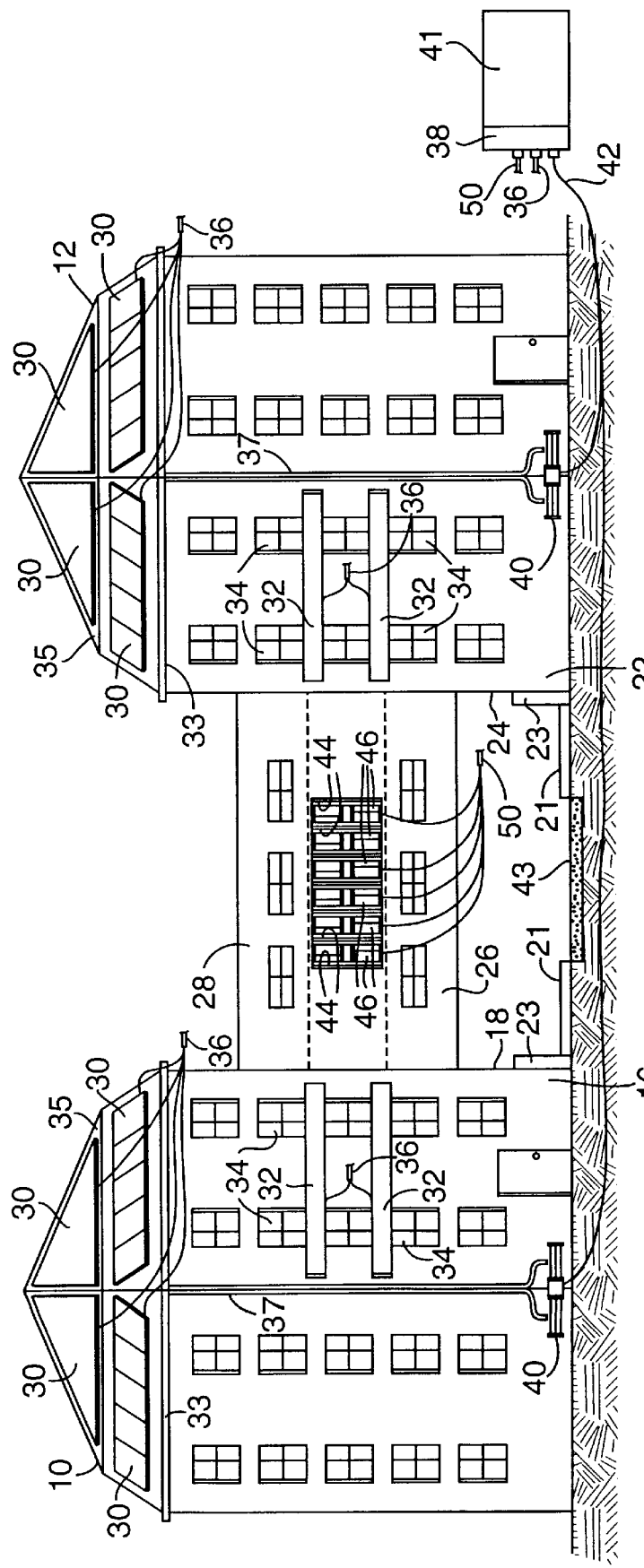
FIG. 2 is a front elevational view of the system and architecture of FIG. 1.

Referring to FIGS. 1 and 2, the system of the invention is shown applied to an exemplary architecture. The illustrated architecture consists of two multi-storied buildings 10 and 12. As seen in FIG. 1, the two buildings 10 and 12 are of generally square or rectangular footprints with the building 10 having two vertical sidewalls 14 and 16 converging to a corner area 18 and with the building 12 having two vertical sidewalls 20 and 22 converging to a corner area 24. Between the two buildings are two elevated walkways 26 and 28 connecting the two buildings 10 and 12, with the illustrated walkway 26 being located at the second floor level of the two buildings and with the illustrated walkway 28 being located at the fourth floor level of the two buildings.

For recovery of solar energy, both of the buildings carry one or more arrays 30 of photovoltaic cells or elements of known construction. As illustrated, some of these photovoltaic arrays can be arrays 30 located on the roofs 35 of the two buildings, and other arrays can be arrays 32 located at available places on one or more of the vertical walls of the building, as for example between horizontal rows of windows 34 as shown in FIG. 2. The electrical power generated by the individual arrays are conducted by suitable conductors to a transmission cable 36 for transmission to the inlet 38 of a local electrical energy receiving and utilizing means 41, the means 41, as mentioned, possibly including various lamps and motors used locally in or immediately outside of the buildings 10 and 12. The means 41 may also include storage batteries for storing excess amounts of electrical energy during periods of peak electrical energy production and for supplying amounts of make-up electrical power during periods of low electrical power production. Further, the means 41 may also include or be a connection to a far-ranging electrical transmission network for supplying excess amounts of produced electrical power to the network.

For recovery of energy from water, the system of FIGS. 1 and 2 includes an arrangement of gutters and drains for collecting rainwater striking the buildings 10 and 12 and for channeling the collected water to one or more water-driven electrical generating units. The arrangement of gutters and drains and the number and construction of the water driven generators used in a particular application may vary widely. By way of example, in FIGS. 1 and 2 for each of the buildings 10 and 12 the gutters include gutters 33 for collecting rainwater flowing from the roof 35, and the drains include a drain 37 for conducting water from the gutters 33 to a water-powered electrical generator 40. The power generated by each generator 40 is conducted by a transmission line 42 to the electrical power inlet 38 of the utilizing means 41.

As to the recovery of energy from wind, in the architecture of FIGS. 1 and 2 between the two walkways 26 and 28, as seen in FIG. 2, are a number of through-going passageways 44, each of which passageways contains a wind-driven electrical generating unit 46.

It will, therefore, be understood from FIG. 1 that when a wind is blowing generally in the direction of the arrow 48, the two walls 16 and 22 of the two buildings 10 and 12 channel the wind toward the passageways 44 and thereby significantly increase the speed of the wind at the place where the wind encounters the generating units 46. Likewise, when the wind is blowing generally in the direction of the arrow 49, the two walls 14 and 20 of the two buildings 10 and 12 channel the wind to the passageways 44 and likewise increase the speed of the wind as it encounters the generating units 46. The power generated by each of the units 46 is transmitted to a transmission cable 50 which conducts the power to the inlet 38 of the power-receiving means 41.

It should be noted from FIGS. 1 and 2 that having the walkways 26 and 28 spaced vertically from one another by the equivalent of the height of one floor of each building allows for such a design that the wind-powered generators can be made accessible for maintenance and/or replacement from either the roof of the passageway 26 or the floor of the passageway 28.

Preferably, and as best seen in FIG. 1, the passageways 26 and 28 are located above a street 43, bordered by sidewalks 21 and walls 23, passing between the two buildings 10 and 12, the street being a two-way street as indicated by the broken arrows 25. Therefore, trucks and cars moving along the street 43 and under the passageways create gusts of wind which impact on the generating units 46 so that the generating units recover at least a part of the energy contained in those gusts and convert it to electrical energy. Further, between each wall 23 and the adjacent building 10 or 12, on both sides of the passageways 26 and 28, as seen in FIG. 1, is a pond 47 of water which, depending on the time of day, can be helpful in reflecting received sunshine onto the photovoltaic arrays 32 carried by the buildings.

As mentioned, both the water-powered electrical generators 40 and the wind-powered electrical generators 46 of the system shown in FIGS. 1 and 2 may take various different forms. Preferably, however, each of the generators 40 and 46 is of a type, referred to herein as a "double speed Savonius rotor electrical generator", which is described in more detail below in connection with FIGS. 3–7. For purposes of description, the apparatus of FIGS. 3–7 is referred to as a wind-powered one, but it should be understood that it can also be used as a water-powered one.

Figure 3:
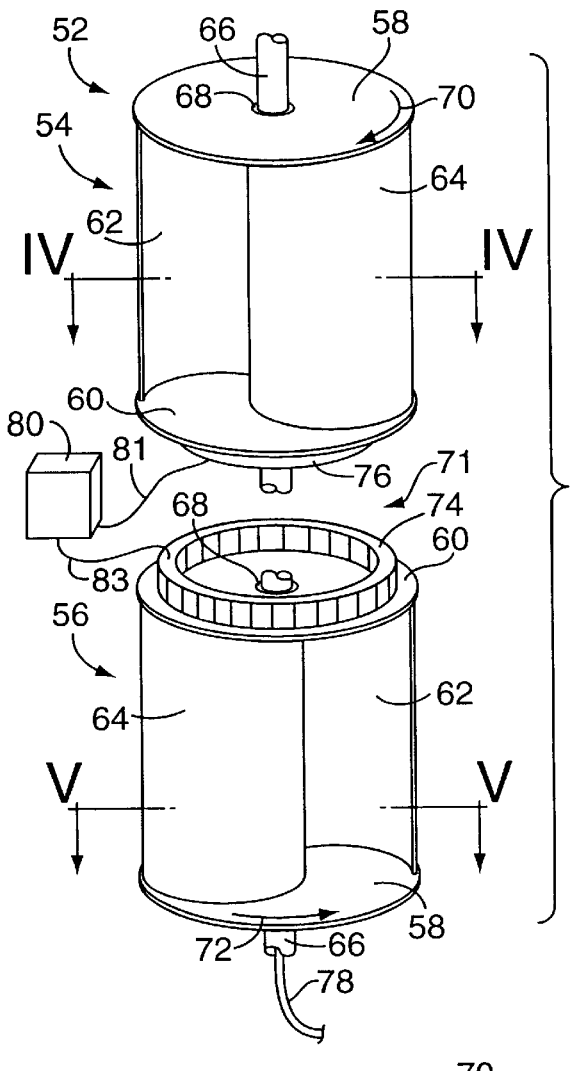
FIG. 3 is a fragmentary perspective, exploded view of a double-speed Savonius wind or water driven electrical power generating energy recovery apparatus used in the system of FIG. 1.
Figure 4:
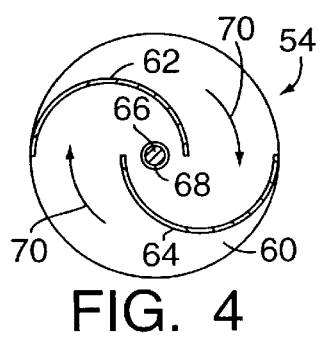
FIG. 4 is a transverse sectional view taken on the line IV—IV of FIG. 3
Figure 5:
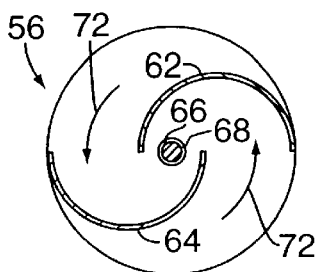
FIG. 5 is a transverse sectional view taken on the line V—V of FIG. 3.

Turning first to FIG. 3, a double speed Savonius rotor electrical generator embodying the invention is there shown generally at 52. It includes two rotor units 54 and 56 which are of substantially identical construction and which can be manufactured economically in large quantities, possibly of plastic material with self-lubricating properties, or using ball bearings and other materials. Each rotor unit is of the well known Savonius design, with each rotor unit including two circular end plates 58 and 60 and two blades 62 and 64. Each blade 62 and 64 is of semi-cylindrical shape, and if wanted, the two blades of each rotor can be made by starting with a cylindrical tubular body and cutting the body along two lines extending parallel to the axis of the body and located in a common plane passing through the axis of the body. The arrangement of the two blades of each rotor relative to one another is preferably such as shown in FIGS. 4 and 5, but other arrangements of the blades relative to one another, and even three or more blades, may be used in each rotor without departing from the invention.

The two rotor units 54 and 56 are supported on a fixed pipe or shaft 66 for rotation relative to the shaft about the shaft's longitudinal axis, as by suitable bearings 68 located at each end of each rotor unit.

Although the two rotor units 54 and 56 are of identical construction, an important aspect of the invention is that they are mounted on the supporting pipe 66 so as to rotate in opposite directions about the pipe 66 when encountered by a wind traveling in any given direction. In particular, to obtain this difference in rotational direction, the two rotor units 54 and 56 are mounted on the pipe 66 so that their two similar end plates 60, 60 are located adjacent to one another as shown in FIG. 3. As a result of this, the blades 62 and 64 of the rotor unit 54 face in directions opposite to the corresponding blades 62 and 64 of the rotor unit 56, as seen in FIGS. 4 and 5. Accordingly, when encountered by a wind of any direction, the upper rotor unit 54 of FIG. 3 will rotate in the direction of the arrow 70 and the lower unit 56 will rotate in the opposite direction of the arrow 72.

As mentioned, Savonius rotors are known to operate at relatively low rotational speeds which are considered not suited to efficient electrical power generation. In the present invention, however, the fact that the two rotors 54 and 56 rotate in opposite directions is taken advantage of to provide for the generation of electrical power at double the speed or frequency such power would be generated by using only a single rotor unit. This is done by providing an electrical power generating device 71 between the two adjacent rotors 54 and 56 with the generating device being of the type having a field means 74 and an armature 76. The field means provides a magnetic field or pattern of magnetic fields through which the armature moves, and the armature carries coils in which electrical power is generated as a result of their movement through the magnetic field or fields of the field means.

Various different types of electromechanical electrical power generating device may be used as the power generating device 71. The device may be one generating either AC power or DC power, depending on the use to which the power is to be put. For example, L. Kamm, *Understanding Electro-Mechanical Engineering*, The Institute of Electrical and Electronic Engineers (1996), at pages 67 to 81 describes a number of generators, and a number of motors which could be reversely driven as generators, that could be used as the generating device 71, these including both devices with permanent magnet fields and devices with wound fields.

Normally, in an electrical generator, one or the other of the field means and armature is fixed relative to the ground and the other of the field means and armature is carried by a shaft or other member supported for rotation relative to the ground, so that the speed of electrical generation is directly related to the speed at which the rotated one of the field means or armature is rotated relative to the ground. In the present instance, however, the field means 74 of the generator 71 is mounted to and carried by the outwardly facing side of the end plate 60 of one of the rotor units 54, 56 and the armature 76 is mounted to and carried by the outer face of the adjacent end plate 60 of the other one of the two rotor units 54 and 56. In FIG. 3, the two rotor units 54 and 56 are shown axially exploded from one another along the length of the pipe 66 to better reveal the field means 74 and 76. In the operationally assembled condition of the two rotor units 54 and 56, however, the two rotor units 54 and 56 are located closer to one another so that the field means 74 and 76 of the electrical power generator move directly adjacent to one another to produce electrical power in the armature 76. The power which is produced in the armature 76 is conducted to a transmission line 78 passing through the pipe 66 by a suitable means (not shown) such as slip rings and brushes or mutual induction coils between the armature 76 and pipe 66.

Due to the illustrated construction of FIG. 3 it will, therefore, be understood that when a wind rotates the two rotor units 54 and 56 in opposite directions, the power generated in the armature 76 of the generating device will be generated at a speed or frequency approximately double that of the speed at which electrical power would be generated by a single one of the rotors 54 or 56 operating by itself to drive an associated generator. It should also be mentioned that in very strong winds or gusts of winds, it is possible that the speeds of the rotor units 54 and 56 may tend to reach self-destructing values at which vibrations and other forces become too great for the rotors and/or their supports to withstand, and during winds of low velocity the rotor units may rotate at very low speeds at which only low amounts of power are generated. Therefore, it may be desirable to associate a control with the apparatus to inhibit rotation of the rotor units at either excessively high speeds or excessively low speeds. Further, if the generator unit is one producing AC power, it may be desirable to have the power generated at a substantially constant frequency, such as for example, the U.S. standard frequency of 60 Hz. In this latter case, it is therefore desirable to associate a control system with the apparatus which maintains the sum of the speeds of the two rotor units at a substantially constant value so as to have the electrical power generated at a constant frequency. If this frequency at which the electric power is constantly generated is either too high or too low, it can be converted to the desired output frequency using a conventional frequency converting circuit.

To effect a control of the speed of the rotor units as suggested in the preceding paragraph, a control unit 80, as shown in FIG. 3, can be provided which senses the sum of the rotational speeds of the two rotor units 54 and 56. This detection can be done by means of separate rotational speed detectors associated with each of the two rotor units 54 and 56 and by means of a circuit within the control unit 80 which sums the values of the two speed detections. However, preferably and as shown in FIG. 3, the control unit 80 detects the sum of the rotational speed of the two rotor units 54 and 56 by detecting the frequency at which electrical power is generated in the armature 76, as such frequency is directly related to the sum of the speed of the two rotor units. A signal related to this detected frequency appears on the line 81. Then, in response to this sensed indication of the sum of the speeds of the two rotor units, the control unit 80 controls, over the line 83, the strength of the magnetic field or fields produced by the field means 74, it being taken in this case that the field means 74 is one producing a field of controllably variable strength, such as one having field coils the current supplied to which is controlled by the control unit 80. As the field strength is increased, the torque imposed on the two rotor units 54 and 56 by the generator increases to slow down the speed of rotation, and similarly when the field strength is reduced, the torque applied to the rotor units is decreased to increase the speed of the rotor units. Further, when the field strength is increased to reduce excessive speeds of the rotor unit, the effect produced is a regenerative braking one on the two rotor units 54 and 56 which causes additional power to be generated by the generator. Thereby, the excess energy in gusts of wind which would otherwise tend to rotate the rotor units at excessive speeds is recaptured as additional electrical energy.

It should also be noticed that the field means 74 on the rotor 56 and the armature 76 on the rotor 55 are of significant mass and thereby provide for each rotor unit a flywheel effect tending to resist changes in the speed of each rotor unit, and this flywheel effect therefore also tends to inhibit rotation of the rotor units at excessive speeds by short gusts of wind. If additional flywheel effect is desired, it can of course be achieved by adding additional weights to the two rotor units.

Figure 6:
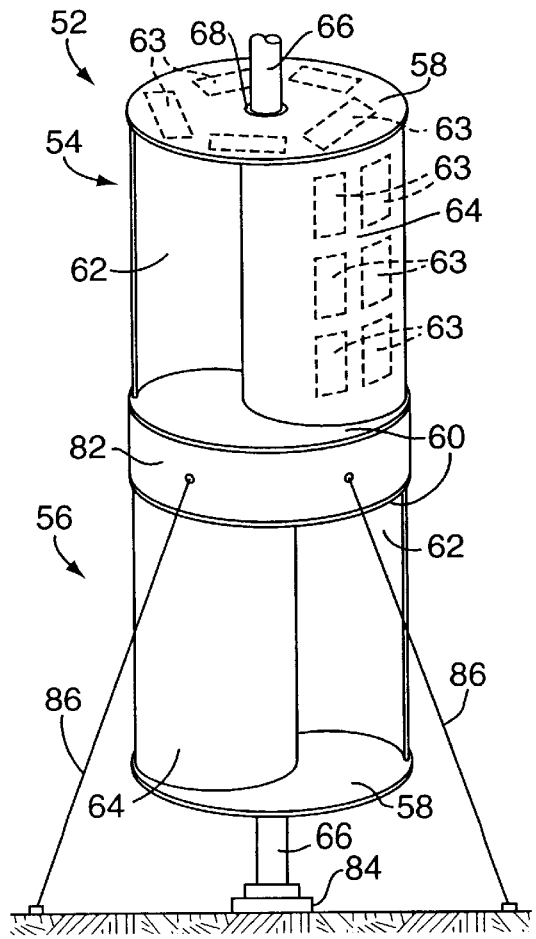
FIG. 6 is a complete perspective view of the double speed Savonius energy recovery apparatus of FIG. 3.

FIG. 6 shows the apparatus 52 of FIG. 3 in completely assembled form in which it will be noted that the space between the two rotor units 54 and 56 containing the electrical generator 71 is enclosed by a cylindrical housing 82 fixed to the pipe 66. In this case, the lower end of the pipe is supported on the ground, or other support structure by a holder 84, and three or more guide wires 86 connected between the housing 82 and ground may be used to vertically steady the apparatus in the event no support is available for holding the upper end of the pipe 66.

Also, it should be understood that, although in FIGS. 3 and 6 the apparatus 52 is shown as being comprised of only two rotor units 54 and 56, if wanted, additional such rotor units may be placed on the pipe 66 adjacent to one another with an electric generating means, similar for example to the generator 71 of FIG. 3 being provided between each adjacent pair of rotor units.

Also, each of the rotors 56 and 56 of the apparatus 52 may be made longer than shown. In general, as each rotor unit is made longer, the power recovered by that unit is increased. A convenient way of making a rotor unit longer is to merely attach to it, end to end, another rotor identical to it.

It should also be understood that in a hybrid system such as that of FIGS. 1 and 2, the apparatuses used for recovery energy from the wind or from flowing water need not necessarily be used exclusively for the generation of electricity. Instead, one or more of the provided wind driven units or flowing water driven units may be used partially or entirely for directly driving associated mechanical devices such as pumps and grinders.

Also, the rotor units 54 and 56 of the apparatus 52 are of relatively simple construction and can conveniently be made from materials providing other structural and functional benefits. For example, the material used in making the rotor units 54 and 56 may be a carbon fiber containing one such as described in the article by Lori Valigra entitled *Carbon-fiber Material May Open the Door to Smart Structures,* Christian Science Monitor (Mar. 26, 1998). Using such material, the rotors can be made to use the carbon fibers for conducting electricity, for storing electrical power and/or for photovoltaically converting the energy of the sun into electrical power, with the fibers used as electrical conductors being used to conduct electrical power from the photovoltaic devices, being used to form part of the electrical generating circuit, or being used as a part of a control circuit for the generator. Additionally, or instead of using the carbon fibers as a photovoltaic means, separate photovoltaic devices may be mounted to various surfaces of the rotor, as indicated in FIG. 6 wherein such photovoltaic devices are indicated by broken lines at 63.

The use of structural materials, such as the one mentioned in the preceding paragraph, having energy storage capacities is further not limited to the rotors of the generating apparatus 52, but instead may also be used in making other parts of the hybrid system. For example, various walls of the buildings 10 and 12 could be made of such material so that the walls serve not only as structural parts of the buildings but also as units for storing energy recovered by one or more of the energy recovery devices of the system.

Another material that may be used in making the above described generating apparatus 52, especially for parts of the electrical generating unit or for a control unit, as hereinafter described in more detail, is the silicon carbide material described by Lee Dye in an Oct. 12, 1998 article distributed by the Los Angeles Times Syndicate and entitled *Advanced Chip Revs Up Electric Car Technology*, so as to allow the involved parts to be made of small size, to operate well over a wide range of temperatures, and to have extremely long and reliable service lives.

Figure 7:
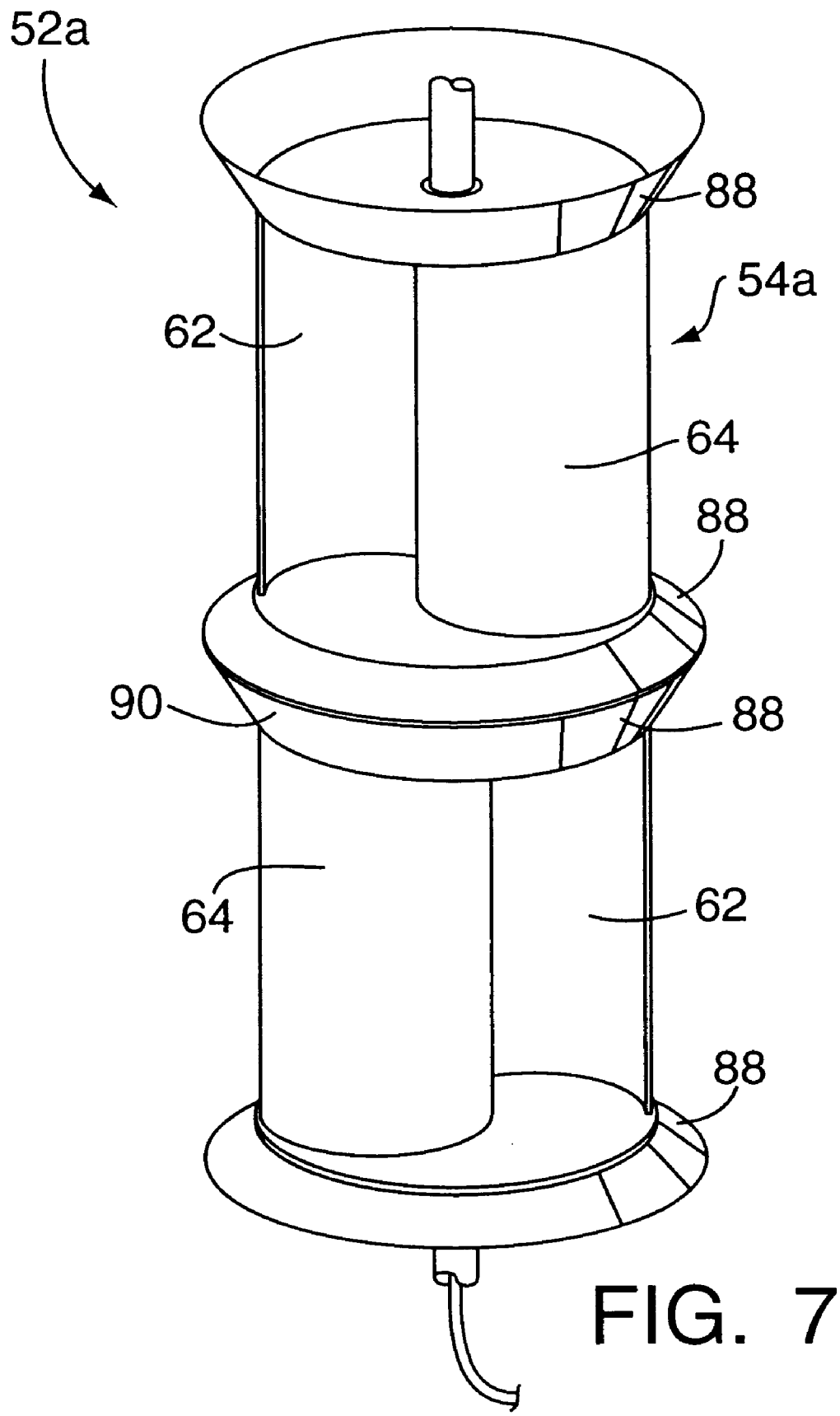
FIG. 7 is an elevational view of a modification of the double speed Savonius energy recovery device of FIG. 3.

FIG. 7 illustrates a modification 52a of the apparatus 52 of FIG. 6. The apparatus of 52a is similar to that of the apparatus 52 except that each of the two rotor units 54a and 56a at each of its axial ends has a frustoconical collar 88. These frustoconical collars 88 serve two purposes. First, the two collars 88 which are adjacent to one another form a housing 90, replacing the cylindrical housing 82 of FIG. 6, for housing the associated electrical generator 71. Secondly, the two collars 88 of each unit 52a and 56a act to channel wind to the blades 62, 64 of the rotor unit in such a way that the speed of the wind which engages the blades is greater than it would otherwise be, and so that the two rotor units are each rotated at a rotational speed somewhat higher than would be the case without the collars 88, 88.

The above described double speed Savonius rotor electrical generating units 52 and 52a may be used so as to be driven either by wind or flowing water. In the case of being powered by wind the axis or rotor rotation is usually vertical, as shown in FIGS. 3, 6 and 7, but if wanted horizontal or tilted orientation of the rotational axis may also be used. In the case of being powered by flowing water, the rotational axis is usually positioned horizontally with the water being discharged onto the rotor units from above the rotor units. Preferably, in the system of FIGS. 1 and 2, the wind powered generators 46 are double speed Savonius rotor electrical generating units such as the herein described units 52 or 52a, but with the generator 46 having their rotational axes positioned horizontally. In the latter case, as shown in FIG. 2, the drain 37 supplying each generator 40 at its lower end is divided into two parts 39a and 39b to approximately divide the flow of water into two parts each supplied to a respective one of the two rotor units 54 and 56 (or 54a and 56a) of the generator.

Figure 8:
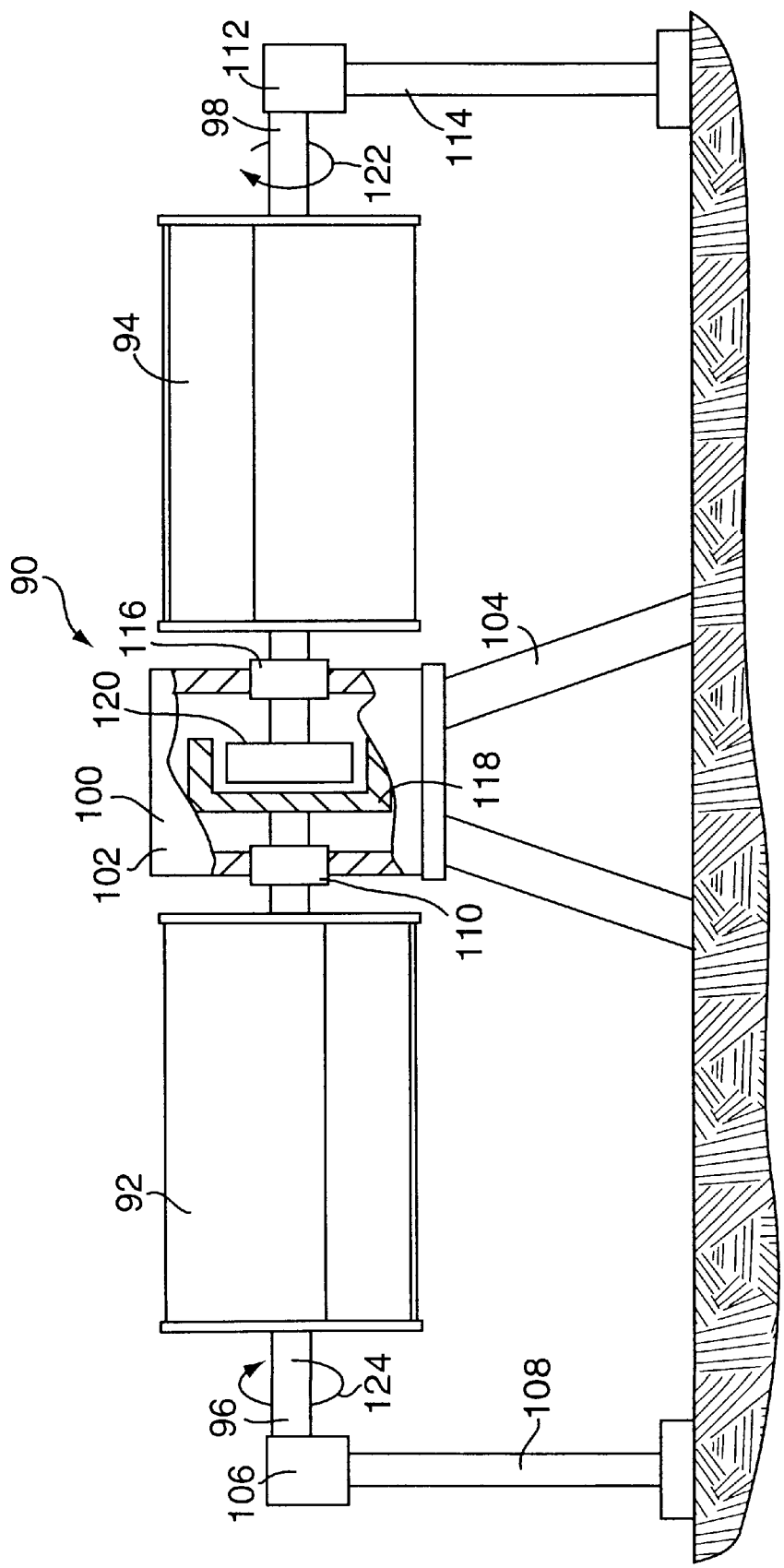
FIG. 8 is an elevational view of another modification of the double speed Savonius energy recovery device of FIG. 3, with parts of the generator housing being broken away to reveal the enclosed field and armature of the generator.

In the above description, the wind powered double speed Savonius rotor electrical generating units 52 and 52a have been shown as ones wherein the rotor units rotate about a vertical axis defined by a central vertical pipe. If desired, however, such device can also be operated to be driven by the wind or flowing water, with the axis of rotor rotation positioned horizontally. FIG. 8, by way of example, shows a modification of the device of FIG. 3 which can be powered by either wind or flowing water and which additionally is made so that the electrical generating unit is enclosed and sealed against moisture, thereby making the apparatus well suited for use in wet and damp situations.

Referring to FIG. 8, the involved double speed Savonius apparatus is indicated generally at 90 and has two counter rotating Savonius rotor units 92 and 94. The rotor 92 is fixed to a shaft or horizontal axle 96 and the rotor 94 is fixed to a horizontal axle 98 aligned with the axle 96. A generator unit 100 is located between the two rotors 92 and 94 and includes an enclosed housing 102 fixed relative to the ground by a suitable support stand 104. The axle 96 is supported at its left-hand end by a moisture sealed bearing unit 106 carried by a stand 108, and at its right end extends into the housing 100 and is supported for rotation relative to the housing 100 by a moisture sealed bearing unit 110. Likewise, the shaft 98 is supported at its right end by a moisture shield bearing unit 112 carried by a stand 114, and at its left-hand end, extends into the housing 102 and is supported for rotation relative to the housing by a moisture sealed bearing unit 116.

Within the housing 102, is a field means, indicated generally at 118 fixed to and carried by the shaft 96, and a cooperating armature, indicated generally at 120, carried by and fixed to the shaft 98. The shaft 94 rotates in the direction of the arrow 122, and the shaft 96 rotates in the contrary direction indicated by the arrow 124. Therefore, the field 118 and armature 120 of the electrical generator, as in the case of the previously described apparatuses 52 and 52a, rotate relative to one another at a speed approximately double the speed of each of the two rotors 92 and 94, or more precisely at a speed equal to the sum of the absolute speeds of the two rotors 92 and 94.

It should also be noted that in placement of wind powered apparatuses, such as those described above at 52, 52a and 90, rigid stands can be used to mount the apparatuses on the roofs of flat top buildings or onto the south facing roofs of buildings with pitched roofs. In the making of such frames, it is desirable to have them constructed so as to distribute stress over a large area of the associated roof. Photovoltaic arrays or panels can then be mounted onto the south facing sides of the frames in a manner allowing vertical positioning of the panels or arrays to keep them from becoming covered with snow and ice in the wintertime. These panels would pick up reflected sunlight from ponds and snow on the ground very effectively. The heat produced on the underside of the photovoltaic devices will cut into efficient electrical generation unless the heat is drawn off to keep the temperature below 70° or 80° F. This heat could be used to melt snow and ice on the photovoltaic devices and to heat the pipe stands and the rotors through which the pipe stands pass. Horizontal counter rotators could be mounted at the top of the pipe stand just north of the photovoltaic devices where they would be heated by the photovoltaics in the winter to melt snow and ice. In spring and fall the bottom of the panels would be slid southwardly and the tops downwardly to a place on the face of the panels at the most efficient angle for the spring season and for the local latitude. At the start of summer, the panels would be slid further south and down to the most effective angles for maximum collection for the latitude. In the fall the angle would be set back to the spring setting and secured. In all positions, the panels would deflect generally southerly directed winds into the rotors. The back or north side of the frame would be sloped similar to the south side and, if covered, would similarly deflect generally northerly directed winds into the rotors.

The closed in north slope could form a watertight and insulated enclosure with a disappearing staircase from the hall below. Two sturdy insulated doors with window lights at each end would give good access to the roof at both ends. The door bottoms should be high enough above the roof level to have a watertight solid section below them to keep any rain or melting snow out. Tools and supplies could be stored under the eaves. A trap door opening upward could cover the staircase opening and plug the staircase opening to provide a continuous level floor to work on. Ideally, the covered stand should be long enough in the east to west direction to easily accommodate a pipe stand with rotors and generating module attached even though one may start with only a few panels and rotors. This way one can economically start up a system with only a few panels and rotors to keep the associated building livable and safe during dangerous outages, and later more panels and rotors can be added as may be desired. If particularly dangerous storms are anticipated, pipe stands and rotors could be carried inside until the storm has passed.

What is claimed is:

1. A system for recovery of energy from a combination of natural and man made energy sources, said system comprising:
    a wind apparatus including a wind driven rotor and an associated electrical generator for generating electrical power from winds,
    a water apparatus including a water driven rotor and an associated electrical generator for generating electrical power from flowing water,
    a solar apparatus including an array of photovoltaic devices for generating electrical power from the sun,
    said wind apparatus, said water apparatus and said solar apparatus being located in close proximity to one another and each having an output on which the electrical power generated by the apparatus appears,
    an electrical power receiving means having an input in close proximity to said apparatuses, and
    means for transmitting the electrical power appearing at said outputs to said input;
    wherein:
    said wind apparatus, said water apparatus, and said solar apparatus are all associated with a given architecture, and
    said architecture includes two walls which converge toward one another and toward an opening through which wind may pass, so that wind moving generally in the direction toward said two converging walls is channeled to said opening so as to have a greater speed when passing through said opening than it would in the absence of said walls and openings, and said wind apparatus is located in said opening, and
    said architecture includes means for collecting rainwater striking said architecture and for channeling the collected rainwater to said water apparatus, and
    said water apparatus is a double speed Savonius rotor electrical generating apparatus.

2. A system for recovering energy from a combination of natural and man made energy sources as defined in claim 1, wherein:
    said two walls are respectively walls of two buildings spaced from one another and connected to one another by an elevated walkway which connects said two buildings and which contains said opening.

3. A system for recovering energy from a combination of natural and man made energy sources as defined in claim 2, wherein:
    said elevated walkway is located above a street so that gusts of wind generated by vehicles travelling toward an undersaid walkway impact on said wind apparatus to cause said wind apparatus to generate electrical power from said gusts.

4. A system for recovering energy from a combination of natural and man made energy sources as defined in claim 1, wherein:
    said wind apparatus is a double speed Savonius rotor electrical generating apparatus.

5. A system for recovering energy from a combination of natural and man made energy sources as defined in claim 4, wherein:
    said double speed Savonius rotor electrical generating apparatus includes two rotor units mounted adjacent to one another for rotation about a common axis of rotation,
    each of said rotor units has at least two blades and with the blades of the two units being arranged that the two rotor units rotate in opposite directions about said common axis under the influence of a given wind, and
    an electrical generator located between said two rotor units,
    said electrical generator having a field means and an armature with said field means being carried by one of said rotor units and with said armature being carried by the other of said rotor units.

6. A system for recovering energy from a combination of natural and man made energy sources as defined in claim 5, wherein:
    each of said rotor units has first and second axial ends and a frustoconical collar positioned at each of said axial ends to channel wind to the blades of the rotor unit.

7. A system for recovering energy from a combination of natural and man made energy sources as defined in claim 1, wherein:
    said double speed Savonius rotor electrical generating apparatus has two rotor units mounted adjacent one another for rotation in opposite directions relative to one another about a common horizontal axis, and
    said means for conducting collected rainwater to said water apparatus includes a means for dividing the flow of collected rainwater into approximately two equal parts and for supplying said two equal parts respectively to said two rotor units of said water apparatus.

8. A system for recovering energy from a combination of natural and man made energy sources as defined in claim 5 wherein:
    a control unit is associated with said double speed Savonius rotor electrical generating apparatus, which control unit senses the speeds of said rotor units and in response to said sensed rotor unit speeds controls the speeds of said rotor units by controlling said electrical generator to controllably vary the strength of the magnetic field created by said field means and thereby the torque exerted on said rotor units by said generator.

9. A system for recovering energy from a combination of natural and man made energy sources as defined in claim 8, wherein:
    electrical generator is one which generates AC electrical power, and
    said control unit senses the speeds of said rotor units by sensing the frequency of the AC power generated by said electrical generator.

10. A system for recovering energy from a combination of natural and man made energy sources as defined in claim 9, wherein:
    said electrical generator is one having a field means of controllably variable field strength, and said control unit controls the speed of said rotor units by controlling the field strength of said field means to exert a regenerative braking effect on said rotor units.

11. A system for recovering energy from a combination of natural and man made energy sources as defined in claim 5, wherein:

at least one of said rotor units of said double speed Savonius rotor carries photovoltaic means for converting received solar energy into electrical energy.

* * * * *